US009643319B2

(12) United States Patent
Ono et al.

(10) Patent No.: US 9,643,319 B2
(45) Date of Patent: May 9, 2017

(54) ENVIRONMENT RECOGNITION DEVICE AND ROBOT (71) Applicant: HONDA MOTOR CO., LTD., Tokyo (JP)

(72) Inventors: Hiroaki Ono, Saitama (JP); Yasuhiro Yamasaki, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/042,415

(22) Filed: Feb. 12, 2016

(65) Prior Publication Data

US 2016/0236350 A1 Aug. 18, 2016

(30) Foreign Application Priority Data

Feb. 17, 2015 (JP) ................................ 2015-028970

(51) Int. Cl.
*G05B 15/00* (2006.01)
*B25J 9/16* (2006.01)
*B25J 19/02* (2006.01)

(52) U.S. Cl.
CPC ........... *B25J 9/1697* (2013.01); *B25J 19/022* (2013.01); *B25J 19/023* (2013.01)

(58) Field of Classification Search
CPC ....... B25J 9/1697; B25J 19/022; B25J 19/023
See application file for complete search history.

(56) References Cited

U.S. PATENT DOCUMENTS

2006/0222317 A1* 10/2006 Ono ..................... G11B 27/034
386/277
2016/0241762 A1* 8/2016 Ono ..................... H04N 5/2257

FOREIGN PATENT DOCUMENTS

JP 2004-183157 7/2004

* cited by examiner

*Primary Examiner* — Ian Jen
(74) *Attorney, Agent, or Firm* — Rankin, Hill & Clark LLP (57) ABSTRACT An environment recognition device (20) is provided with a first opening (20c1) through which a harness (20g) passes on a side surface of a frame (20c) below an environment recognition unit (20a). An upper base (10) below the frame (20c) is provided with a second opening (10b) through which the harness (20g) passes. A coupling mechanism (21) configured to couple the environment recognition unit (20a) and the upper base (10) supports the frame (20c) such that the frame (20c) is rotatable about an axis parallel to an upper surface of the upper base (10). A cover (21a) covers the first opening (20c1), the second opening (10b), and part of the harness (20g) extending between the first opening (20c1) and the second opening (10b).

8 Claims, 8 Drawing Sheets

ENVIRONMENT RECOGNITION DEVICE AND ROBOT

BACKGROUND OF THE INVENTION

Field of the Invention

The present invention relates to an environment recognition device configured to recognize ambient environment using an optical sensor or a distance sensor and to a robot.

Description of the Related Art

Conventionally, there is a robot including, as with a human, a base serving as a body, a head provided at an upper portion of the base, right and left arms extending respectively from upper right and left sides of the base, and right and left legs extending downward from a lower portion of the base.

A robot including an environment recognition device has been known as the robot of this type (see, e.g., Japanese Patent Laid-Open No. 2004-183157), the environment recognition device being configured such that a head provided with, e.g., an embedded optical sensor for recognizing ambient environment serves as an environment recognition unit, that a body serves as a base, and that a neck joint mechanism serves as a coupling mechanism.

In this robot including the environment recognition device, the following configuration may be employed: the head is rotatable about a yaw axis, a pitch axis, and a roll axis relative to the base, and a harness electrically connecting between control equipment disposed in the hollow base and the environment recognition unit serving as the head passes inside any of these axes.

The conventional environment recognition device is not configured considering waterproofing from rainwater etc. For this reason, water might enter inside the base through a joint mechanism clearance such as a clearance between a rotary shaft of the head and the base. Thus, in the case where the environment recognition device is used under the environment where rainwater etc. might contact the environment recognition device, a waterproofing unit needs to be provided to protect internal equipment.

For example, in the robot using the environment recognition device as described in Japanese Patent Laid-Open No. 2004-183157, a robot protection wear is employed as a waterproofing unit, and is put on the robot to prevent water from entering the base.

However, such a waterproofing unit not only interrupts operation of the environment recognition device, but also leads to an increase in device size.

The present invention has been made in view of the above-described points, and provides a compact environment recognition device having high waterproofing and a robot using the environment recognition device.

SUMMARY OF THE INVENTION

In order to accomplish the above-described object, an environment recognition device of the present invention includes a hollow base, an environment recognition unit disposed above the base, an environment recognition unit control circuit disposed in the base and configured to control the environment recognition unit, a coupling mechanism attached to an upper portion of the base and configured to couple the environment recognition unit to the base, and a harness configured to electrically connect the environment recognition unit and the environment recognition unit control circuit. The environment recognition device includes a frame extending from a lower surface of the environment recognition unit to the base. The frame is provided with a first opening through which the harness passes on a side surface thereof. The base is provided with a second opening through which the harness passes. The coupling mechanism supports the frame such that the environment recognition unit is rotatable about an axis parallel to an upper surface of the base. A cover configured to cover at least the first opening, the second opening, part of the harness extending between the first and second openings is provided between the base and the environment recognition unit.

In an environment recognition device including an environment recognition unit above a base, it is often the case that a clearance is formed between the base and a joint mechanism configured to couple the base and the environment recognition unit. Particularly in the case where the environment recognition unit is rotatable about a yaw axis, the yaw axis extends in the vertical direction of the base. Thus, it is often the case that water goes down from the environment recognition unit to the joint mechanism along the yaw axis and then, enters the base through the clearance between the joint mechanism and the base.

For this reason, in the environment recognition device of the present invention, rotation of the environment recognition unit is made only about the axis (a pitch axis or a roll axis) parallel to the upper surface of the base. Moreover, the environment recognition unit is not directly fitted into the base, but is supported by the coupling mechanism via the frame provided below the environment recognition unit (i.e., the clearance formed around the axis is along the horizontal direction). This prevents water from entering the base.

Further, in the environment recognition device of the present invention, the environment recognition unit-side first opening through which the harness passes is formed on the side surface of the frame. Thus, the clearance through which water enters the base can be closed in such a manner that the first opening, the base-side second opening, and part of the harness are covered. That is, sufficient waterproofing can be ensured with the relative-small cover.

Thus, according to the environment recognition device of the present invention, high waterproofing can be exhibited without using a large waterproofing unit.

In the environment recognition device of the present invention, the base is preferably provided with a water drain hole penetrating the base below the frame of the environment recognition unit.

This water drain hole prevents water from accumulating at the upper portion of the base, and a discharge path of such water can be optionally formed. This leads to higher waterproofing without an increase in entire device size.

In the environment recognition device of the present invention, a drive mechanism configured to rotate the environment recognition unit is preferably provided inside the frame or the cover.

With the drive mechanism disposed at such a position, an inner space of the device can be effectively utilized, leading to a decrease in entire device size.

In the environment recognition device of the present invention, the coupling mechanism preferably supports the frame such that the environment recognition unit is rotatable about the pitch axis relative to the base, and the environment recognition unit preferably includes a first sensor configured to recognize environment forward of the base, and a pair of right and left second sensors arranged at both sides of the environment recognition unit and configured to recognize environment of sides of the base.

In the case where the rotatable range of the environment recognition unit is made to be about the axis horizontal to the base, the recognizable area of a single sensor is narrower than that in a conventional device configured to rotate about all of the yaw axis, the pitch axis, and the roll axis. Thus, when the environment recognition unit is configured to rotate about the pitch axis, if the first sensor for front recognition and the second sensors for side recognition are provided, a sufficiently-wide recognizable area of the sensors can be obtained.

In the case where the pair of right and left second sensors are arranged at both sides of the environment recognition unit, the environment recognition device of the present invention preferably further includes second sensor control equipment disposed in the environment recognition unit and configured to control operation of the second sensors, and each second sensor preferably includes a hollow support extending laterally from the environment recognition unit, a driver attached to a lower tip end portion or an upper tip end portion of the support, a measurer attached to the support at an opposite side to the driver to rotate about the yaw axis, and a distance sensor harness configured to electrically connect the driver or the measurer with the second sensor control equipment. The distance sensor harness preferably extends into the environment recognition unit through an inside of the support.

With this configuration, an opening hole of the inner space of the support, in which the distance sensor harness passes, on the side close to the environment recognition unit is along the horizontal direction. This prevents water from entering the environment recognition unit through the opening, and prevents lowering of waterproof properties.

In order to accomplish the above-described goal, a robot of the present invention includes an environment recognition device including a hollow base, a joint mechanism, and a movable link coupled to the base via the joint mechanism. The environment recognition device includes an environment recognition unit disposed above the base, an environment recognition unit control circuit disposed inside the base and configured to control the environment recognition unit, a coupling mechanism attached to an upper portion of the base and configured to couple the environment recognition unit to the base, a harness configured to electrically connect the environment recognition unit and the environment recognition unit control circuit, and a frame extending from a lower surface of the environment recognition unit to the base. The frame is provided with a first opening through which the harness passes, on a side surface thereof. The base is provided with a second opening through which the harness passes. The coupling mechanism supports the frame such that the environment recognition unit is rotatable about an axis parallel to an upper surface of the base. A cover configured to cover at least the first opening, the second opening, part of the harness extending between the first and second openings is provided between the base and the environment recognition unit.

As described above, the environment recognition device is applicable to the robot. Particularly in the case where the robot is a bipedal robot imitating the form of a human, the environment recognition unit of the environment recognition device serves as a head of the robot, and the coupling mechanism serves as a neck join mechanism.

Moreover, the robot of the present invention preferably further includes a plurality of movable links; and a plurality of joint mechanisms each coupled such that a corresponding one of the movable links is rotatable relative to the base. The plurality of movable links preferably include a pair of right and left arm links provided at an upper portion of the base, and a pair of right and left leg links provided at a lower portion of the base. The robot is preferably switchable between a two-legged walking mode using only the leg links or the arm links and a four-legged walking mode using the leg links and the arm links. The coupling mechanism preferably supports a frame such that the environment recognition unit is rotatable about the pitch axis or the roll axis relative to the base.

As described above, in the case of the robot capable of switching between the two-legged walking mode and the four-legged walking mode, the surface positioned on the upper side of the robot in the two-legged walking mode is on the front side of the robot in the four-legged walking mode.

As long as the environment recognition unit of the environment recognition device is rotatable about the pitch axis or the roll axis, a rotation axis is parallel to the surface of the base in any mode. Thus, no water enters the base along the axis, and waterproof properties are not lowered.

DETAILED DESCRIPTION OF THE PREFERRED EMBODIMENTS

An embodiment of a robot of the present invention will be described with reference to drawings. A robot 1 of the present embodiment is a humanoid robot, and is configured to move by switching between a two-legged walking mode and a four-legged walking mode.

Note that the robot of the present invention is not limited to the humanoid robot configured as described above, and includes different forms of robots, such as other industrial robots, from that of the robot 1 of the present embodiment as long as these robots each include a base, a coupling mechanism, and an environment recognition device including an environment recognition unit coupled to an upper portion of the base via the coupling mechanism.

Figure 1:
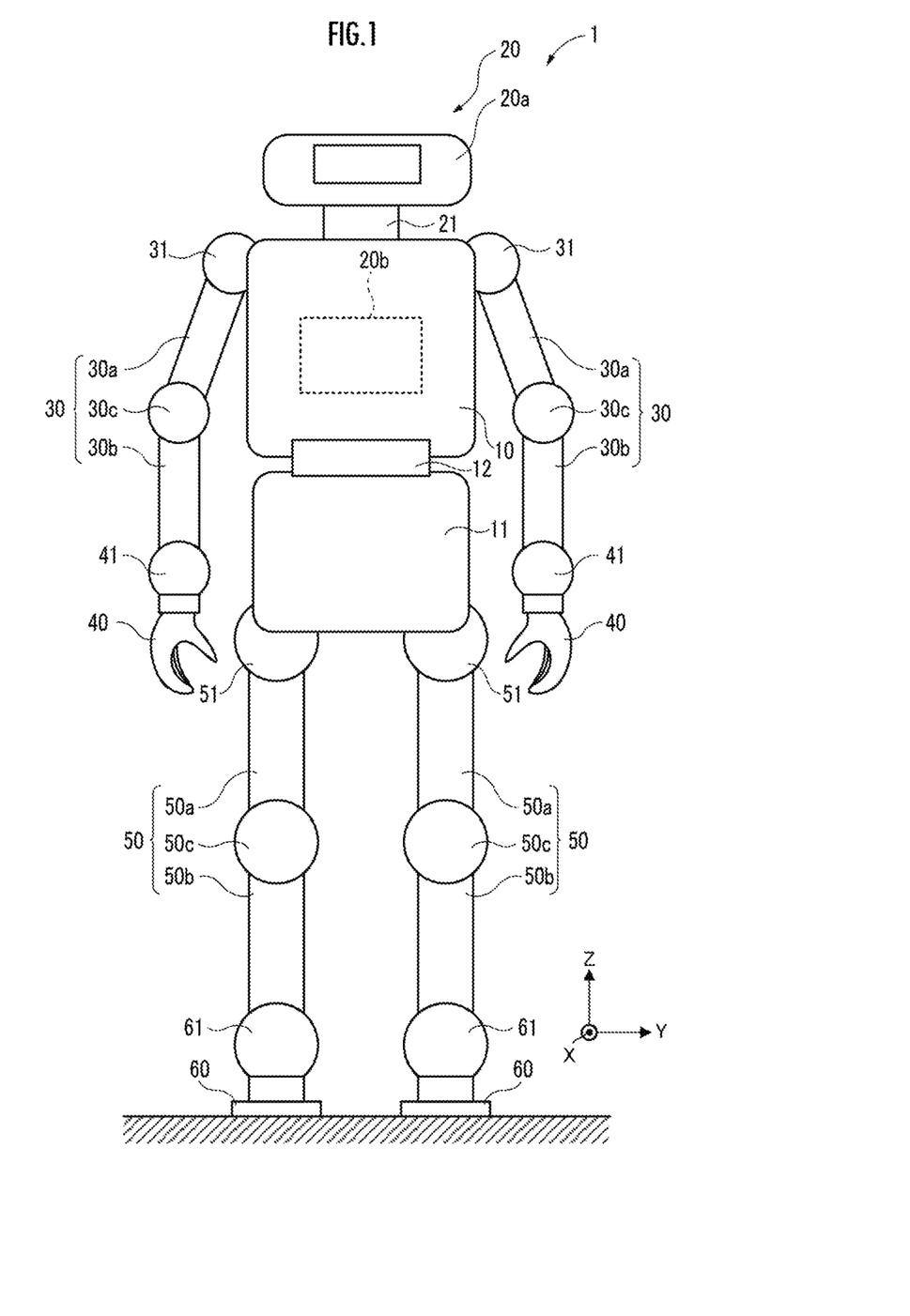
FIG. 1 is a front view schematically illustrating the configuration of a robot of an embodiment of the present invention.

First, the configuration of the robot 1 of the present embodiment will be described with reference to FIG. 1.

A body of the robot 1 includes an upper base 10, a lower base 11 disposed below the upper base 10, and a waist joint mechanism 12 provided between the upper base 10 and the lower base 11. The upper base 10 and the lower base 11 are coupled together via the waist joint mechanism 12 corresponding to the waist joint of a human to rotate relative to each other.

A head of the robot 1 is an environment recognition unit 20a of an environment recognition device 20 configured to recognize ambient environment. The environment recognition unit 20a is rotatably coupled to the upper base 10 via a neck joint mechanism 21 corresponding to the neck joint of a human.

Sensors configured to recognize the distance to cameras for imaging external environment or to external environment, are mounted on the environment recognition unit 20a. The cameras and the sensors are controlled by an environment recognition unit control circuit 20b disposed inside the upper base 10.

Since the robot 1 of the present embodiment is the humanoid robot, the environment recognition unit 20a corresponding to the head of a human is provided above the upper base 10. However, the environment recognition unit of the robot of the present invention is not limited to such a configuration. Depending on, e.g., usage environment of the robot, the environment recognition unit of the robot of the present invention may be provided at a position (e.g., a front portion of the upper base) other than the position above the upper base.

Right and left arms of the robot 1 are a pair of arm links (movable links) 30 extending respectively from upper right and left sides of the upper base 10. Each arm link 30 is rotatably coupled to the upper base 10 via a shoulder joint mechanism 31 corresponding to the shoulder joint of a human.

Each arm link 30 includes a first arm link portion 30a corresponding to the upper arm of a human, a second arm link portion 30b corresponding to the front arm of a human, and an elbow joint mechanism 30c corresponding to the elbow joint of a human.

The first arm link portion 30a is rotatably coupled to the upper base 10 via the shoulder joint mechanism 31. The second arm link portion 30b is rotatably coupled to the first arm link portion 30a via the elbow joint mechanism 30c. A hand 40 corresponding to the hand of a human is coupled to a tip end of the second arm link portion 30b.

Note that in the robot 1 of the present embodiment, each arm link 30 serving as the arm includes the first arm link portion 30a, the second arm link portion 30b, and the elbow joint mechanism 30c. However, the arm of the robot of the present invention is not limited to such a configuration, and may include a single link portion or include three or more link portions and a plurality of joint portions coupling the link portions together.

The hand 40 is an example of an end effector. The hand 40 is rotatably coupled to the second arm link portion 30b of the arm links 30 via a wrist joint mechanism 41 corresponding to the wrist joint of a human. In the robot 1 of the present embodiment, the hand 40 and the arm link 30 form a robot arm serving as a manipulator.

Right and left legs of the robot 1 are a pair of right and left leg links 50 (movable link) extending downwardly from a lower portion of the lower base 11. Each leg link 50 is rotatably coupled to the lower base 11 via a hip joint mechanism 51 corresponding to the hip joint of a human.

Each leg link 50 includes a first leg link portion 50a corresponding to the thigh of a human, a second leg link portion 50b corresponding to the lower thigh of a human, and a knee joint mechanism 50c corresponding to the knee joint of a human.

The first leg link portion 50a is rotatable coupled to the lower base 11 via the hip joint mechanism 51. The second leg link portion 50b is rotatably coupled to the first leg link portion 50a via the knee joint mechanism 50c. A foot 60 corresponding to the foot of a human is coupled to a tip end of the second leg link portion 50b.

Note that in the robot 1 of the present embodiment, each leg link 50 serving as the leg includes the first leg link portion 50a, the second leg link portion 50b, and the knee joint mechanism 50c. However, the leg of the robot of the present invention is not limited to such a configuration, and may include a single link portion or include three or more link portions and a plurality of joint portions coupling the link portions together.

The foot 60 is rotatably coupled to the second leg link portion 50b of the leg link 50 via an ankle joint mechanism 61 corresponding to the ankle joint of a human.

Next, the degree of freedom of each joint mechanism of the robot 1 of the present embodiment will be described with reference to FIG. 2.

Unless otherwise provided, the direction of rotation of each member by each joint mechanism will be, in the present embodiment, described based on a posture (hereinafter referred to as a "reference posture") when any of the joint mechanisms do not rotate the members coupled thereto. In the case of the robot 1 of the present embodiment, the reference posture is the state when the robot 1 stands up straight (the state in which the upper base 10, the lower base 11, the arm links 30, and the leg links 50 extend substantially in the vertical direction).

Figure 2:
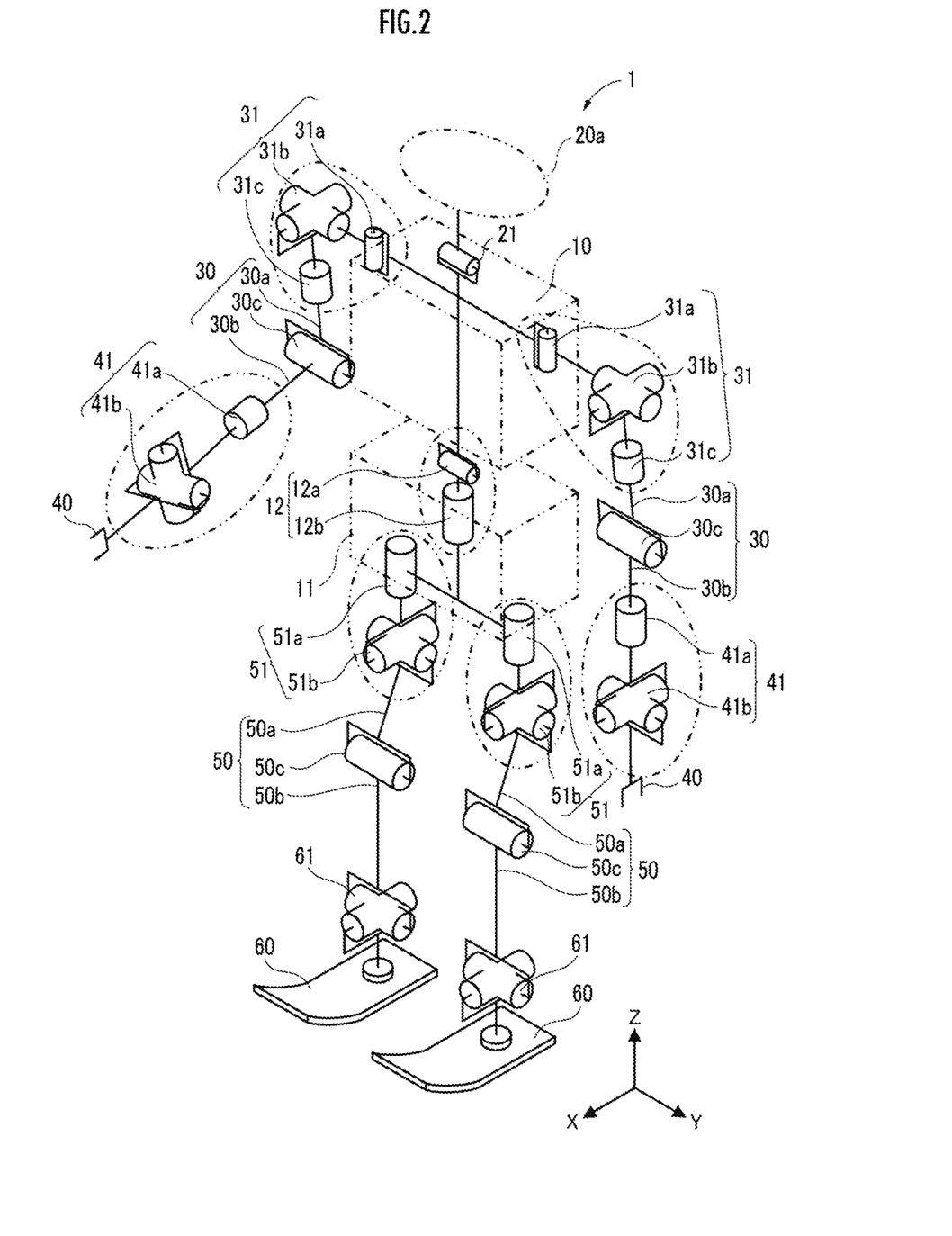
FIG. 2 is a perspective view schematically illustrating the degree of freedom of each joint mechanism of a robot of FIG. 1.

Moreover, in the description of the present embodiment, a yaw axis, a pitch axis, and a roll axis respectively indicate, as illustrated in FIG. 2, the vertical axis (Z-axis), the right-left axis (Y-axis), and the front-back axis (X-axis) of the robot 1 when the robot 1 is in the reference posture. In this case, the yaw axis is the body trunk axis of the upper base 10 and the lower base 11.

The waist joint mechanism 12 includes a first waist joint mechanism 12a disposed below the upper base 10, and a second waist joint mechanism 12b disposed between the first waist joint mechanism 12a and the lower base 11.

The first waist joint mechanism 12a is coupled such that the upper base 10 is rotatable about the pitch axis relative to the lower base 11 and the second waist joint mechanism 12b. The second waist joint mechanism 12b is coupled such that the upper base 10 and the first waist joint mechanism 12a are rotatable about the yaw axis relative to the lower base 11.

The neck joint mechanism 21 is coupled such that the environment recognition unit 20a is rotatable about the pitch axis relative to the upper base 10.

The elbow joint mechanism 30c of each arm link 30 is coupled such that the second arm link portion 30b corresponding to the front arm of a human is rotatable about the pitch axis relative to the first arm link portion 30a corresponding to the upper arm of a human.

Each shoulder joint mechanism 31 includes a first shoulder joint mechanism 31a disposed within the range of the vertical and horizontal widths of the upper base 10, a second shoulder joint mechanism 31b disposed at the side of the first shoulder joint mechanism 31a outside the upper base 10, and a third shoulder joint mechanism 31c disposed between the second shoulder joint mechanism 31b and the first arm link portion 30a of the arm link 30.

The "width" of the base used herein indicates the width between the highest position and the lowest position of the base in the vertical direction in a normal usage state. Similarly, the "width" indicates the width between the foremost position and the rearmost position of the base or between the rightmost position and the leftmost position of the base in the horizontal direction in the normal usage state.

The first shoulder joint mechanism 31a is coupled such that the second shoulder joint mechanism 31b is rotatable about the yaw axis relative to the upper base 10. The second shoulder joint mechanism 31b is coupled such that the third shoulder joint mechanism 31c is rotatable about the pitch axis and the roll axis relative to the first shoulder joint mechanism 31a. The third shoulder joint mechanism 31c is coupled such that the arm link 30 is rotatable about the yaw axis relative to the second shoulder joint mechanism 31b.

Each wrist joint mechanism 41 includes a first wrist joint mechanism 41a disposed on the side close to the hand 40 of the second arm link portion 30b of the arm link 30, and a second wrist joint mechanism 41b disposed between the first wrist joint mechanism 41a and the hand 40.

The first wrist joint mechanism 41a is coupled such that the second wrist joint mechanism 41b is rotatable about the yaw axis relative to the second arm link portion 30b. The second wrist joint mechanism 41b is coupled such that the hand 40 is rotatable about the roll axis and the pitch axis relative to the first wrist joint mechanism 41a.

The knee joint mechanism 50c of each leg link 50 is coupled such that the second leg link portion 50b corresponding to the lower limb of a human is rotatable about the pitch axis relative to the first leg link portion 50a corresponding to the thigh of a human.

The hip joint mechanism 51 includes a first hip joint mechanism 51a disposed below the lower base 11, and a second hip joint mechanism 51b disposed on the side close to the leg link 50 relative to the first hip joint mechanism 51a.

The first hip joint mechanism 51a is coupled such that the second hip joint mechanism 51b is rotatable about the yaw axis relative to the lower base 11. The second hip joint mechanism 51b is coupled such that the leg link 50 is rotatable about the pitch axis and the roll axis relative to the first hip joint mechanism 51a.

Each ankle joint mechanism 61 is coupled such that the foot 60 is rotatable about the pitch axis and the roll axis relative to the second leg link portion 50b.

Note that the configurations of the waist joint mechanism, the shoulder joint mechanism, the elbow joint mechanism, the wrist joint mechanism, the knee joint mechanism, the hip joint mechanism, and the ankle joint mechanism in the robot of the present invention are not limited to the above-described configurations. These configurations may be optionally changeable depending on an intended use of the robot and a joint arrangement space in the robot. For example, any of the join mechanisms may be omitted, or a joint mechanism(s) other than the above-described joint mechanisms may be added.

Next, the two walking modes of the robot 1 of the present embodiment will be described with reference to FIGS. 3 and 4. Note that in FIG. 3, the arm links 30 are not shown for the sake of easy understanding.

Note that in the description of the present embodiment, "landing" of the hands 40 or the feet 60 means that the hands 40 or the feet 60 come into contact with external environment such that the hands 40 or the feet 60 receive contact reactive force against force acting on the robot 1.

Figure 3:
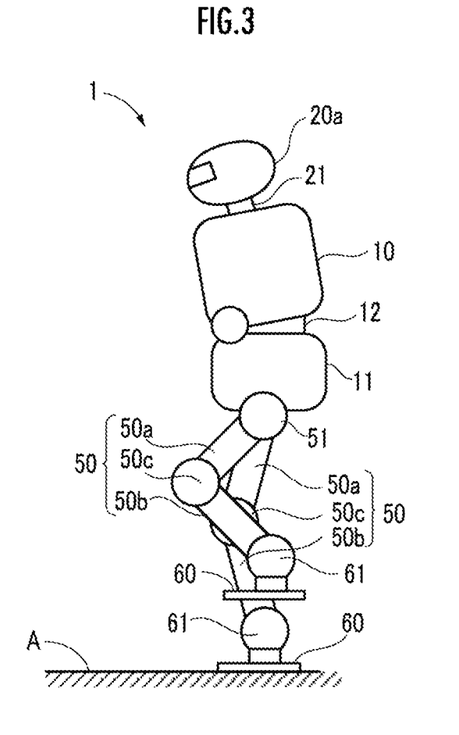
FIG. 3 is a side view illustrating the state in which the robot of FIG. 1 moves in a two-legged walking mode.

As illustrated in FIG. 3, in the two-legged walking mode, the following process is repeated: while the foot 60 at the tip end of one of the pair of leg links 50 is landed on the ground A (one of the leg links 50 is used as a support leg), the foot 60 at the tip end of the other leg link 50 moves in the air and then, is landed (the other leg link 50 operates as an idling leg). In this case, the leg links 50 alternately operate as the idling leg. Moreover, the not-shown arm links 30 is in a non-landed state.

Figure 4:
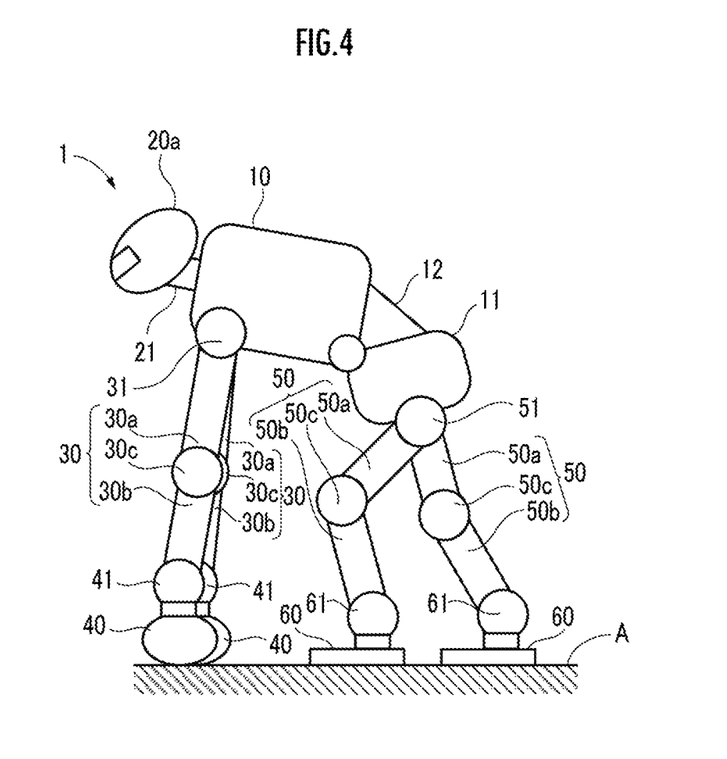
FIG. 4 is a side view illustrating the state in which the robot of FIG. 1 moves in a four-legged walking mode.

As illustrated in FIG. 4, in the four-legged walking mode, the following process is repeated: while two or three of the hands 40 at the tip ends of the arm links 30 and the feet 60 at the tip ends of the leg links 50 are landed on the ground A (two or three of the arm links 30 and the leg links 50 are in a state of support legs), the remaining two or one of the hands 40 and the feet 60 move in the air and then, are landed (the remaining two or one of the arm links 30 and the leg links 50 operate as idling legs). In this case, at least one of the arm links 30 and the leg links 50 operating as the idling leg is periodically switched under a predetermined rule.

Note that the operation in the four-legged walking mode is not limited to the above-described operation. For example, the following process may be repeated: while one of the hands 40 at the tip ends of the arm links 30 and the feet 60 at the tip ends of the leg links 50 is landed on the ground A (one of the hands 40 and the feet 60 is in a state of a support leg), the remaining three of the hands 40 and the feet 60 move in the air and then, are landed (the remaining three of the hands 40 and the feet 60 operate as idling legs).

Alternatively, the following process can be repeated: the hands 40 at the tip ends of the arm links 30 and the feet 60 at the tip ends of the leg links 50 move all together in the air (i.e., the robot 1 jumps), and then, are landed.

Next, the configurations of the upper base 10, the environment recognition device 20, and the neck joint mechanism 21 of the robot 1 of the present embodiment will be described in detail with reference to FIGS. 1 and 5 to 8.

Figure 5:
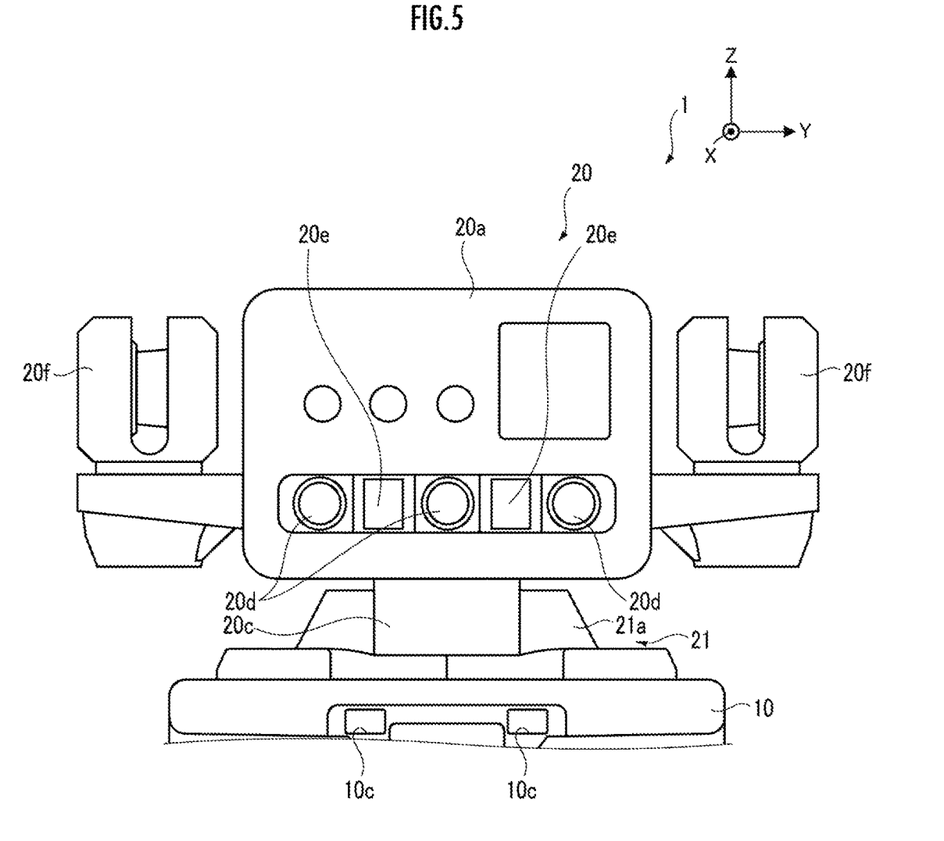
FIG. 5 is a front view illustrating an environment recognition unit, a neck joint mechanism, and a partial structure of an upper portion of an upper base in the robot of FIG. 1.

As illustrated in FIG. 5, the environment recognition device 20 includes the environment recognition unit 20a disposed above the upper base 10. The environment recognition unit 20a is controlled by the environment recognition unit control circuit 20b (not shown in FIG. 5, and see FIG. 1) disposed inside of the hollow upper base 10. The environment recognition unit 20a and the upper base 10 are coupled together by the neck joint mechanism 21.

A neck frame (frame) 20c extends downward (i.e., toward the upper base 10) from a lower surface of the environment recognition unit 20a. Since the neck frame 20c is rotatably supported by the neck joint mechanism 21, the environment recognition unit 20a is rotatable about the pitch axis (Y-axis) relative to the upper base 10.

Moreover, the environment recognition unit 20a includes a plurality of cameras (first sensors) 20d configured to acquire an image of environment in the front of the upper base 10 to recognize such environment, lights 20e each disposed between the cameras 20d and formed of, e.g., an LED, and a pair of right and left sensors (second sensors) 20f arranged at both sides of the environment recognition unit 20a to recognize environment at the sides of the upper base 10.

Note that in the present embodiment, a laser range finder (hereinafter referred to as an "LRF") is used as the sensor 20f. The LRF (laser range finder) is configured to measure the time until an irradiated laser beam is reflected by external environment and returns to the LRF to measure the distance to the external environment based on the measured time.

The second sensor of the present invention is not limited to the LRF, and may be any sensors as long as external environment at the sides of the environment recognition unit 20a can be recognized. For example, an infrared sensor may be used.

In the robot 1, the environment recognition unit 20a is rotatable about the pitch axis relative to the upper base 10.

However, since the cameras 20*d* and the sensors 20*f* are arranged as described above, the recognizable area of the robot 1 has substantially the same size as that of a conventional robot rotatable about all of a yaw axis (Z-axis), a pitch axis (Y-axis), and a roll axis (X-axis).

Figure 6:
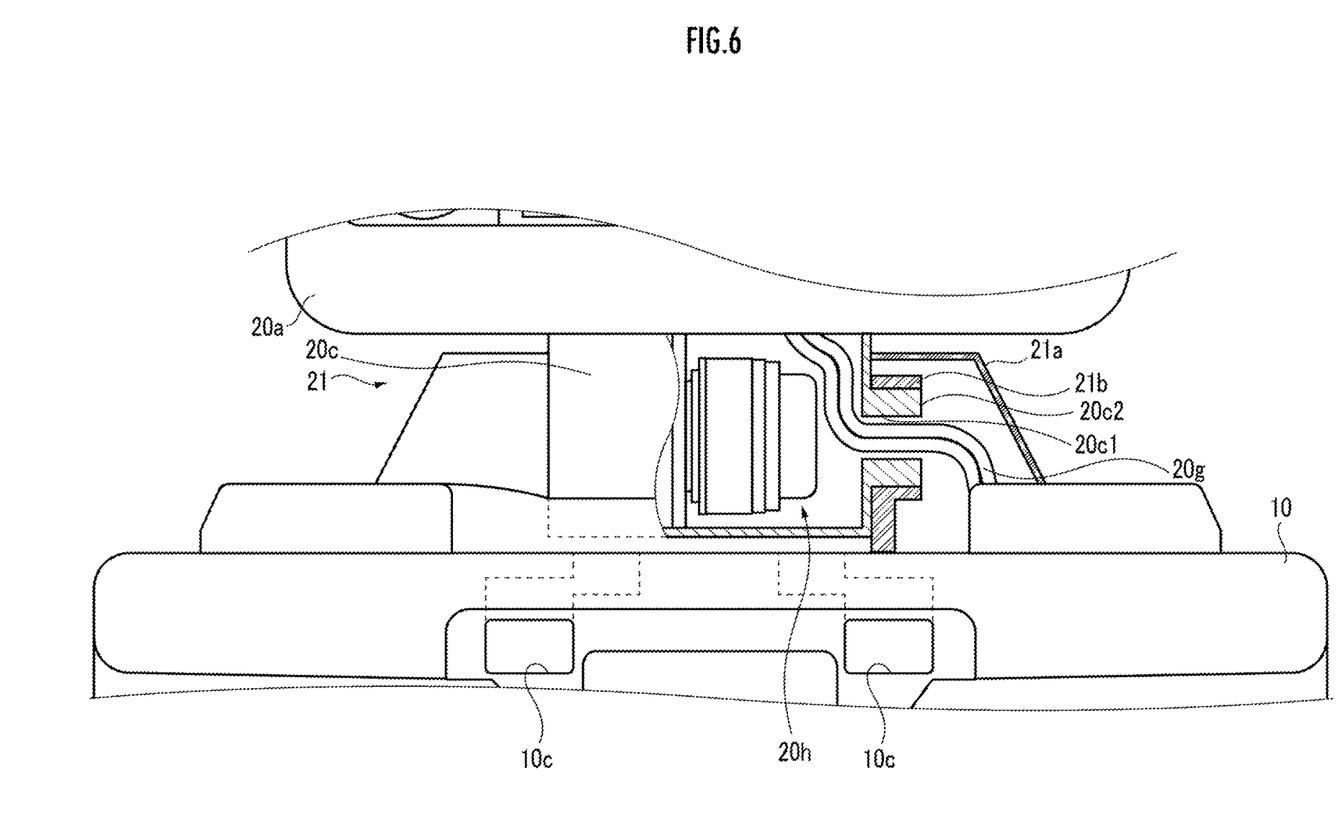
FIG. 6 is a front view illustrating a partial cross-sectional structure of the neck joint mechanism of the robot of FIG. 1.

As illustrated in FIG. 6, the neck frame 20*c* is, on a side surface thereof, provided with a neck frame opening (first opening) 20*c*1. A harness 20*g* electrically connected to internal equipment of the environment recognition unit 20*a* and extending from a lower portion of the environment recognition unit 20*a* passes through the neck frame opening 20*c*1. A circular protrusion 20*c*2 is formed to extend laterally to the neck frame 20*c* from the periphery of the neck frame opening 20*c*1.

Note that the "frame" in the present invention is not limited to the hollow frame as described above, and may be any frames as long as a frame extends from the lower surface of the environment recognition unit toward the base and is formed with a space inside so that the harness can pass through.

Moreover, a drive mechanism 20*h* including a drive source such as an actuator, a brake, a reducer, etc. is disposed inside the neck frame 20*c*. The neck frame 20*c* rotates by drive force transmitted from the drive mechanism 20*h*. Since the drive mechanism 20*h* is disposed at the above-described position in the robot 1, a space where the drive mechanism 20*h* is disposed is not required separately at other positions, leading to space saving.

Figure 7:
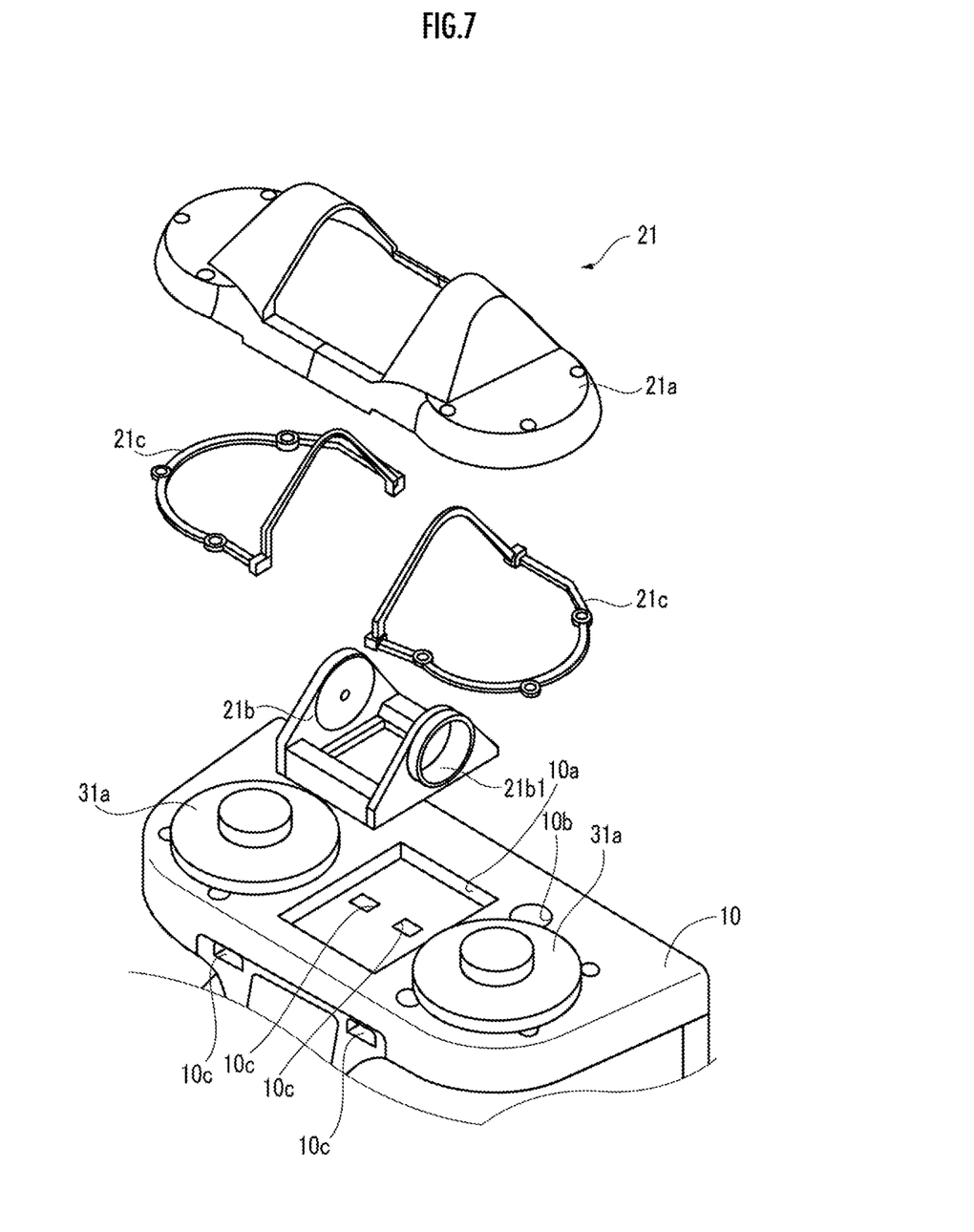
FIG. 7 is an exploded perspective view illustrating the structure of the neck joint mechanism of the robot of FIG. 1.

As illustrated in FIG. 7, the neck joint mechanism 21 includes a cover 21*a* disposed on an upper portion of the upper base 10, a shaft support member 21*b* fitted into a center opening of the cover 21*a* to rotatably support the neck frame 20*c*, and sealing mechanisms 21*c* which are rubber O-rings configured to seal between the cover 21*a* and the shaft support member 21*b* and between the cover 21*a* and the upper base 10.

The cover 21*a* and the sealing mechanisms 21*c* are integrally fixed to the upper base 10 with waterproof bolts (not shown), and are fixed to the shaft support member 21*b* with engagement claws (not shown). Thus, there is no clearance formed due to lifting up of the cover 21*a*. Note that the sealing mechanisms 21*c* are not shown in FIG. 6.

The shaft support member 21*b* is disposed on the upper portion of the upper base 10, the shaft support member 21*b* being fitted into a recess 10*a* formed on an upper surface of the upper base 10. The shaft support member 21*b* holds and sandwiches from right and left the neck frame 20*c* extending from the lower surface of the environment recognition unit 20*a*, as well as sealing the center opening of the cover 21*a*.

One side surface of the shaft support member 21*b* is provided with a shaft support member opening 21*b*1. The circular protrusion 20*c*2 of the neck frame 20*c* is fitted into the shaft support member opening 21*b*1 (see FIG. 6).

The upper base 10 is provided with an upper base opening (second opening) 10*b* formed on the back side of the first shoulder joint mechanism 31*a*. The harness 20*g* extending from the environment recognition unit 20*a* is, through the upper base opening 10*b*, electrically connected to the environment recognition unit control circuit 20*b* disposed inside the upper base 10.

The cover 21*a* covers the side surface (i.e., the neck frame opening 20*c*1) of the shaft support member 21*b*, the upper base opening 10*b* of the upper base 10, and part of the harness 20*g* extending between the neck frame opening 20*c*1 and the upper base opening 10*b*.

As described above, the robot 1 of the present embodiment is configured such that the environment recognition unit 20*a* is not rotatable about the yaw axis (Z-axis), but is rotatable only about the pitch axis (Y-axis). Moreover, the robot 1 is configured such that the environment recognition unit 20*a* is not directly fitted into the upper base 10, but the neck frame 20*c* is supported by the shaft support member 21*b* (i.e., no yaw axis (Z-axis) is directly provided for the upper base 10). Thus, in the robot 1, no water enters into the upper base 10 along the axis.

Moreover, in the robot 1 of the present embodiment, the neck frame opening 20*c*1 is formed on the side surface of the neck frame 20*c*. Thus, the clearance through which water enters the inside of the upper base 10 can be closed in such a manner that the neck frame opening 20*c*1, the upper base opening 10*b* of the upper base 10 side, and part of the harness 20*g* are covered. That is, sufficiently waterproofing can be realized with the relatively-small cover 21*a*.

In addition, the robot 1 of the present embodiment can switch between the two-legged walking mode and the four-legged walking mode. Thus, the surface positioned on the upper side of the robot in the two-legged walking mode is on the front side of the robot in the four-legged walking mode. However, the robot 1 is configured such that the environment recognition unit 20*a* is rotatable about the pitch axis (i.e., in any mode, the rotation axis is parallel to the surface of the upper base 10), and therefore, no water enters the upper base 10 along the axis.

As illustrated in FIGS. 6 and 7, inlet openings of water drain holes 10*c* penetrating the upper base 10 to communicate with the front side of the upper base 10 are formed at a position below the neck frame 20*c* extending from the lower surface of the environment recognition unit 20*a* provided at an upper surface side of the upper base 10.

Since the water drain holes 10*c* are formed at the robot 1 of the present embodiment, this prevents water from accumulating at the upper portion of the upper base 10, and the discharge path of such water can be optionally formed. This leads to higher waterproofing from such water.

Figure 8:
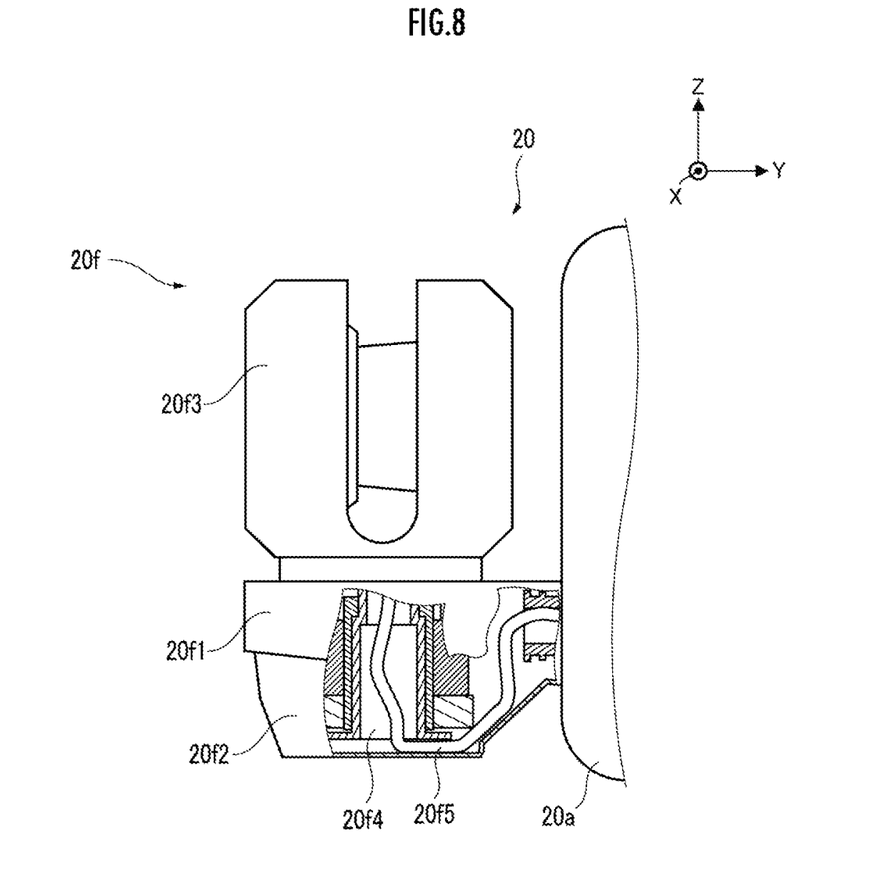
FIG. 8 is a front cross-sectional view illustrating part of the structure of a distance sensor of the robot of FIG. 1.

As illustrated in FIG. 8, each sensor 20*f* includes a support 20*f*1 extending laterally from the environment recognition unit 20*a*, a driver 20*f*2 attached below a tip end portion of the support 20*f*1, and a measurer 20*f*3 rotatably attached to an upper side of the tip end portion of the support 20*f*1.

A communication path 20*f*4 is formed inside the support 20*f*1 and the driver 20*f*2. A distance sensor harness 20*f*5 passes through inside of the communication path 20*f*4, and electrically connects the driver 20*f*2 and the measurer 20*f*3 with a second sensor control equipment (not shown) disposed inside the environment recognition unit 20*a*.

Since the communication path 20*f*4 is formed inside the support 20*f*1, an opening hole of the communication path 20*f*4 close to the environment recognition unit 20*a* is along the horizontal direction. This prevents water from entering inside of the environment recognition unit 20*a* through the opening.

Note that in the present embodiment, the driver 20*f*2 is disposed below the support 20*f*1, and the measurer 20*f*3 is disposed above the support 20*f*1. However, the driver 20*f*2 may be disposed above the support 20*f*1, and the measurer 20*f*3 may be disposed below the support 20*f*1.

The embodiment has been described with reference to the drawings, but the present invention is not limited to such an embodiment.

For example, in the above-described embodiment, the neck joint mechanism 21 is coupled such that the environment recognition unit 20*a* is rotatable about the pitch axis. However, the present invention is not limited to such a configuration. The coupling mechanism may be attached to the upper portion of the base, and may couple the environment recognition unit to the base such that the environment recognition unit is rotatable about the axis parallel to the upper surface of the base. That is, the environment recognition unit may be coupled to rotate about the roll axis.

Moreover, in the above-described embodiment, the environment recognition device 20 includes the cameras 20d configured to acquire an image of the front of the robot 1, and the pair of right and left sensors 20f configured to recognize the side of the robot 1. However, the present invention is not limited to such a configuration, and other sensors may be used. For example, a single sensor may be provided at the center of the robot 1 to rotate about the yaw axis.

Further, in the above-described embodiment, the drive mechanism 20h rotating the environment recognition unit 20a is disposed inside the neck frame 20c extending from the lower surface of the environment recognition unit 20a. However, the present invention is not limited to such a configuration, and the drive mechanism may be disposed at another location. For example, the drive mechanism may be disposed in a space inside a cover for covering a hole through which the harness passes.

In addition, in the above-described embodiment, the cover 21a and the shaft support member 21b are configured as separate members. However, the present invention is not limited to such a configuration. For example, the cover and the shaft support may be integrally configured.

Moreover, in the above-described embodiment, the water drain holes 10c are formed at the upper base 10. However, the present invention is limited to such a configuration, and the water drain holes 10c may be omitted.

Further, in the above-described embodiment, the shaft support member 21b is disposed above the upper base 10 with the shaft support member 21b being fitted into the recess 10a formed on the upper surface of the upper base 10. However, the coupling mechanism of the present invention is not limited to such a configuration. For example, the upper surface of the upper base 10 may be formed flat, and the shaft support member 21b may be fixed to such a surface with, e.g., waterproof bolts.

In addition, in the above-described embodiment, the cover 21a and the sealing mechanisms 21c which are the rubber O-rings are fixed to the upper base 10 and the shaft support member 21b with the waterproof bolts and the engagement claws. However, the present invention is not limited to such a configuration, and other methods may be used for fixing the cover 21a and the sealing mechanisms 21c. For example, the cover and the sealing mechanisms may be bonded to the upper base and the shaft support member. Moreover, the sealing mechanism may be, other than the rubber O-ring, configured using, e.g., bonding with an adhesive, swaging, pressure-fitting, or screwing.

REFERENCE SIGNS LIST 1 robot
10 upper base
10a recess
10b upper base opening (second opening)
10c water drain hole
11 lower base
12 waist joint mechanism
12a first waist joint mechanism
12b second waist joint mechanism
20 environment recognition device
20a environment recognition unit
20b environment recognition unit control circuit
20c neck frame (frame)
20c1 frame opening (first opening)
20c2 circular protrusion
20d camera (first sensor)
20e light
20f sensor (second sensor)
20f1 support
20f2 driver
20f3 measurer
20f4 communication path
20f5 distance sensor harness
20g harness
20h drive mechanism
21 neck joint mechanism (coupling mechanism)
21a cover
21b shaft support member
21b1 shaft support member opening
21c sealing mechanism
30 arm link (movable link)
30a first arm link portion
30b second arm link portion
30c elbow joint mechanism
31 shoulder joint mechanism
31a first shoulder joint mechanism
31b second shoulder joint mechanism
31c third shoulder joint mechanism
40 hand
41 wrist joint mechanism
41a first wrist joint mechanism
41b second wrist joint mechanism
41d driver
50 leg link (movable link)
50a first leg link portion
50b second leg link portion
50c knee joint mechanism
51 hip joint mechanism
51a first hip joint mechanism
51b second hip joint mechanism
60 foot
61 ankle joint mechanism
A ground

What is claimed is:

1. An environment recognition device including
a hollow base,
an environment recognition unit disposed above the base,
an environment recognition unit control circuit disposed in the base and configured to control the environment recognition unit,
a coupling mechanism attached to an upper portion of the base and configured to couple the environment recognition unit to the base, and
a harness configured to electrically connect the environment recognition unit and the environment recognition unit control circuit, the environment recognition device comprising:
a frame extending from a lower surface of the environment recognition unit to the base,
wherein the frame is provided with a first opening through which the harness passes, on a side surface thereof,
the base is provided with a second opening through which the harness passes,
the coupling mechanism supports the frame such that the environment recognition unit is rotatable about an axis parallel to an upper surface of the base, and
a cover configured to cover at least the first opening, the second opening, part of the harness extending between the first and second openings is provided between the base and the environment recognition unit.

2. The environment recognition device of claim 1, wherein
the base is provided with a water drain hole penetrating the base, below the frame of the environment recognition unit.

3. The environment recognition device of claim 1, wherein
a drive mechanism configured to rotate the environment recognition unit is provided inside of the frame.

4. The environment recognition device of claim 1, wherein
a drive mechanism configured to rotate the environment recognition unit is provided inside of the cover.

5. The environment recognition device of claim 1, wherein
the coupling mechanism supports the frame such that the environment recognition unit is rotatable about a pitch axis relative to the base, and
the environment recognition unit includes a first sensor configured to recognize environment forward of the base, and a pair of right and left second sensors arranged at both sides of the environment recognition unit and configured to recognize environment of sides of the base.

6. The environment recognition device of claim 5, further comprising:
a second sensor control equipment disposed in the environment recognition unit and configured to control operation of the second sensors, wherein
each second sensor includes:
a hollow support extending laterally from the environment recognition unit;
a driver attached to a lower tip end portion or an upper tip end portion of the support;
a measurer attached to the support at an opposite side to the driver to rotate about a yaw axis; and
a distance sensor harness configured to electrically connect the driver or the measurer with the second sensor control equipment, wherein
the distance sensor harness extends into the environment recognition unit through an inside of the support.

7. A robot comprising:
an environment recognition device including a hollow base;
a joint mechanism; and
a movable link coupled to the base via the joint mechanism, wherein
the environment recognition device comprises:
an environment recognition unit disposed above the base;
an environment recognition unit control circuit disposed inside the base and configured to control the environment recognition unit;
a coupling mechanism attached to an upper portion of the base and configured to couple the environment recognition unit to the base;
a harness configured to electrically connect the environment recognition unit and the environment recognition unit control circuit;
a frame extending from a lower surface of the environment recognition unit to the base, wherein
the frame is provided with a first opening through which the harness passes, on a side surface thereof,
the base is provided with a second opening through which the harness passes,
the coupling mechanism supports the frame such that the environment recognition unit is rotatable about an axis parallel to an upper surface of the base, and
a cover configured to cover at least the first opening, the second opening, part of the harness extending between the first and second openings is provided between the base and the environment recognition unit.

8. The robot of claim 7, wherein
the movable link includes a plurality of movable links,
the joint mechanism includes a plurality of joint mechanisms each configured to rotatably couple a corresponding one of the plurality of movable links to the base,
the plurality of movable links include a pair of right and left arm links provided at the upper portion of the base, and a pair of right and left leg links provided at a lower portion of the base,
the robot is switchable between a two-legged walking mode using only the leg links or the arm links and a four-legged walking mode using the leg links and the arm links, and
the coupling mechanism supports the frame such that the environment recognition unit is rotatable about a pitch axis relative to the base.

* * * * *